Feb. 6, 1923.
T. N. RATTERREE.
HEATER.
FILED JULY 24, 1922.
1,444,086
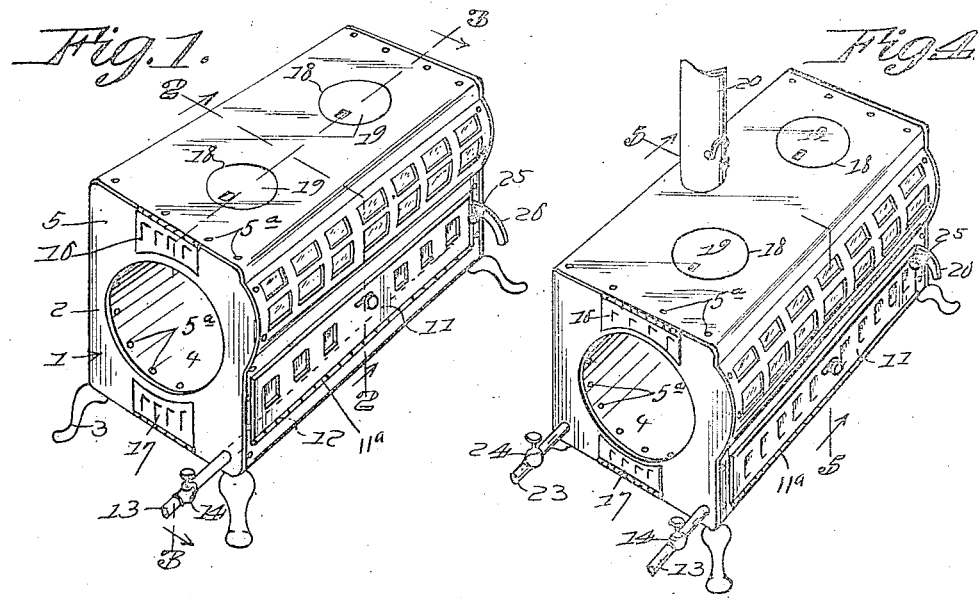
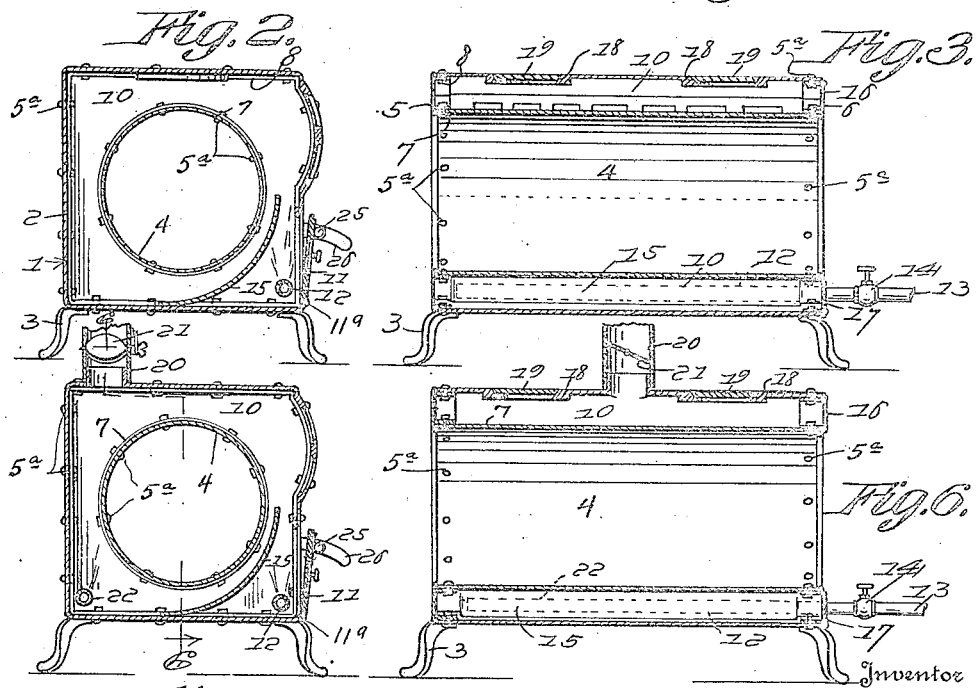
Inventor
T. N. Ratterree,
By Watson E. Coleman
Attorney Patented Feb. 6, 1923.

1,444,086

UNITED STATES PATENT OFFICE.

THOMAS N. RATTERREE, OF PICHER, OKLAHOMA.

HEATER.

Application filed July 24, 1922. Serial No. 577,162.

*To all whom it may concern:*

Be it known that I, THOMAS N. RATTERREE, a citizen of the United States, residing at Picher, in the county of Ottawa and State of Oklahoma, have invented certain new and useful Improvements in Heaters, of which the following is a specification, reference being had to the accompanying drawings.

The present invention has for its purpose the provision of a heater including inner and outer walls, the space between them being closed at the ends of the heater, and wherein the inner wall encloses a hollow and open ended chamber, to permit the air in the room to pass therethrough, so as to thoroughly heat the same, and since the space between the two walls carries a circulation of heat, the air in the room around the outer wall and upon the interior of the inner wall becomes heated.

A further purpose of the invention is to provide a heater including a central drum within the heater together with a heating element, and means for causing the heat from the heating element to circulate about the drum to thereby completely heat the surface thereof.

It is to be understood that the particulars herein given are in no way limitative and that while still keeping within the scope of the invention, any desired modifications of detail and desired proportions may be made in the apparatus according to circumstances.

The invention comprises further features and combination of parts, as will be hereinafter set forth, shown in the drawing and claimed.

In the drawing:—

Figure 1 is a view in perspective of the improved heater constructed in accordance with the invention;

Figure 2 is a cross sectional view on line 2—2 of Figure 1;

Figure 3 is a longitudinal sectional view on line 3—3 of Figure 1;

Figure 4 is a perspective view of a modified form of heater, wherein a flue is made to carry off smoke or fumes;

Figure 5 is a sectional view on line 5—5 of Figure 4;

Figure 6 is a longitudinal sectional view through the form shown in Figure 4.

Referring to the drawing, 1 designates the body of the heater, which is mounted upon suitable supporting legs 3. The body of the heater comprises the outer and inner walls 2 and 4. The inner wall is preferably cylindrical, though it may be oblong or rectangular in cross section, or otherwise shaped. The outer wall or body of the heater may be any suitable shape, preferably as shown. The inner wall is mounted on the heads of the outer wall and spaced from the outer wall. In order to close the space between the inner and outer walls, and for the purpose of holding the inner wall in position suitable heads 5 and 6 are employed. These heads are constructed as shown in Figure 3, and are provided with inner and outer flanges 7 and 8, which telescope between the inner and outer walls of the heater. The flanges of the heads 5 and 6 are fastened to the inner and outer walls of the heater by means of stove bolts or the like 5$^a$.

In event the inner wall become burnt or otherwise destroyed, the same may be readily replaced by removing the bolts from the heads 5 and 6, thereby permitting the insertion of a new core or inner wall.

Mounted in the chamber or space 10 between the inner and outer walls, preferably in the lower part thereof adjacent the front of the heater where the draft door 11 is located is a burner 12, to which a pipe or tube 13 is connected. The pipe 13 is provided with a valve 14 controlling the supply of fuel such as vaporized gasoline or the like to the burner.

In the operation of the heater when the burner is ignited, the heat rising therefrom is directed by the walls of the chamber 10 during the initial period of its travel about the outer surface of the drum. This heat then either passes from the heater through the outlet pipe if such be provided, or is pocketed within the heater if no outlet pipe be provided or if the damper of the oulet pipe be closed. Were the burner 15 arranged approximately centrally of the heater so that the heat at both sides thereof would be balanced, the pocketed heat would remain stationary, but since the burner is arranged at one side of the heater, there is an area of unbalanced heat, or a cool spot at the back of the heater. Air from this cool spot is drawn by the heat rising from the burner between the wall of the drum 7 and the curved baffle plate 15 by reason of the suction created at the upper end of the baffle plate and accordingly the cool spot of the heater is partially evacuated causing some of the pocketed heat to drop and starting a circulation which will continue about the drum 7 until the temperature within the heater is substantially uniform at all points. It is, of course, understood that in a heater of this type there is always sufficient leakage at joints and the like to permit of excess pressure which would otherwise gather within the heater to escape. Where a damper and outlet pipe are provided and the damper is opened, a substantially similar operation takes place, the rising heat on its way to the damper creates a suction at the upper edge of the baffle plate 15, drawing a portion of the air from the back of the heater upwardly to join the escaping gases, this air and the escaping gases, or the major portion thereof, passing from the flue. However, since the space remote from the burner has been partially evacuated, it is obvious that a portion of these escaping gases must pass downwardly about the drum to fill the evacuated space. It will furthermore be obvious that this operation will continue so long as the damper is open and that accordingly at all times a heated current of air will be passing about the drum 7 at all parts thereof to heat the same and thereby transmit the heat to the room. In addition to the heat afforded by the heating of the drum 7, there is, of course, that heat dispersed by the outer casing of the heater.

The head 5 of the heater is provided with upper and lower doors or closures 16 and 17 for the purpose of permitting access to the interior of the space between the inner and outer walls, whereby a suitable instrument (not shown) may be inserted in the space and the adjacent surfaces of the walls scraped, for the purpose of removing the carbon and soot. Obviously by opening the draft door 11 the burner may be lighted. The top of the heater is provided with suitable openings 18 for the reception of caps or covers 19. Obviously these caps or covers may be removed, to permit pans to be placed over the openings, to be heated from the heat passing through the space 10 between the inner and outer walls.

In Figure 4 the top of the heater is provided with a suitable flue or pipe 20 including a damper 21. Also in Figures 4 and 5 a second burner 22 is mounted in the space or chamber 10 at the bottom thereof adjacent the left hand part of the heater, there being a pipe 23 connected thereto for supplying vaporized gasoline or the like to the burner 22. This pipe 23 has a valve 24, by which the fuel or vaporized gasoline or the like is controlled to the burner 22.

When the two burners are used to supply heat in the space or chamber 10 the damper in the flue or pipe is opened, therefore the heat from the two burners will fill the entire space between the inner and outer walls of the heater, and by means of the pipe or flue, the smoke or fumes are readily carried off. In this case, however, the baffle 15 is useless, as the heat from the two burners fills the entire space between the inner and outer walls, and the baffle has no effect whatever upon the heat, that is to say insofar as dividing it or directing it in order that it may travel around the inner wall.

However when using the form of heater shown in Figures 4 and 5, and when only a small or medium supply of heat is required the heat from the back burner 22 may be dispensed with, by closing the valve 24 in the pipe 23, and by closing the damper in the flue, the heat from the single burner in front will travel through the space or chamber 10 and around the inner wall, as accomplished by means of the construction shown in Figures 1, 2 and 3.

The draft door 11 is pivoted along its lower edge, as indicated at 11$^a$, and may be held in adjusted position by means of a thumb screw 25 engaging an arcuate arm 26 carried by the outer wall of the heater. It will be obvious that by opening this door, a portion of the heat from the heater will pass directly into the room, the amount of such heat passing to the room being governed by the amount of opening of the door.

The invention having been set forth, what is claimed is:—

1. In a heater, an outer wall, a drum arranged within the heater and opening through the wall thereof, a heating element arranged within the heater, and a baffle plate within the heater and extending from the wall thereof to a point adjacent the surface of the drum but spaced therefrom, the baffle plate forming a guide for the upward passage of heat from said heating element.

2. In a heater, a casing, a drum within the casing and having its ends opening through the walls thereof, the ends of the drum being open, a heater arranged within the casing in substantial parallelism to the axis of the drum and adjacent one side wall of the casing, and a baffle plate secured at its lower edge to the bottom of the casing and having its upper edge extending above the heater and between the wall of the drum and the adjacent wall of the casing.

3. In a heater, a casing, a drum within the casing and having its ends opening through the walls thereof, the ends of the drum being open, a heater arranged within the casing in substantial parallelism to the axis of the drum and adjacent one side wall of the casing, a baffle plate secured at its lower edge to the bottom of the casing and having its upper edge extending above the heater and between the wall of the drum and the adjacent wall of the casing, and an outlet pipe for said casing arranged at a point on the casing remote from the heater with respect to the drum.

In testimony whereof I hereunto affix my signature.

THOMAS N. RATTERREE.